Oct. 24, 1950
S. W. ÅHBLOM
2,526,921
COMPASS SCALE OF AIRCRAFT COMPASSES
AND MARINER'S COMPASSES
Filed July 14, 1945
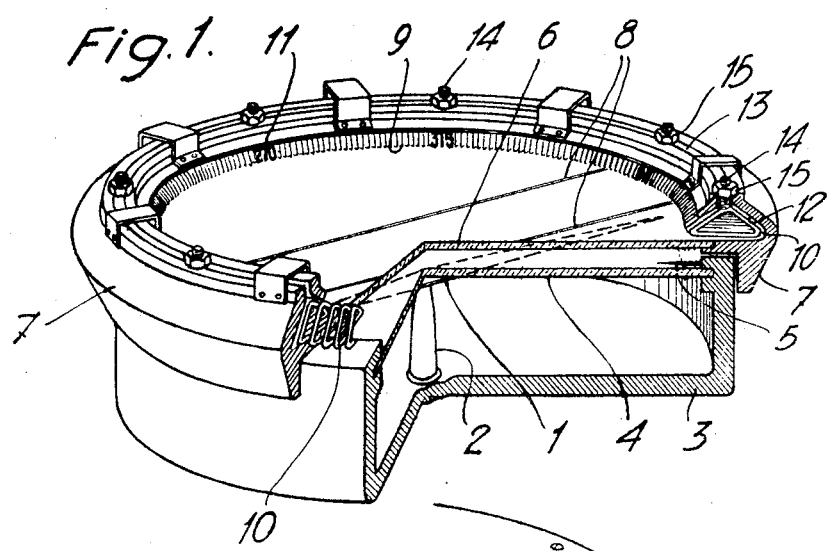
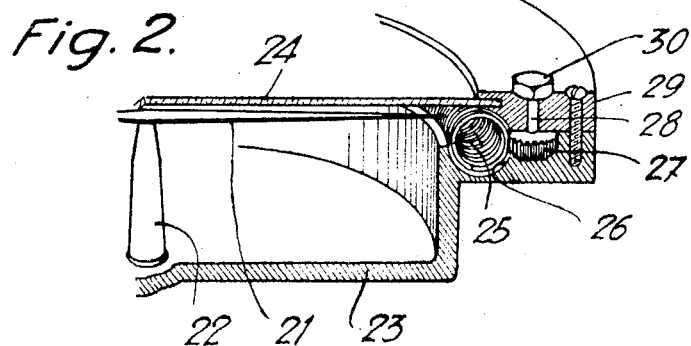
Inventor:
Sven Wilhelm Åhblom
by W. Bayard Jones
Attorney.

Patented Oct. 24, 1950

2,526,921

UNITED STATES PATENT OFFICE 2,526,921

COMPASS SCALE OF AIRCRAFT COMPASSES AND MARINERS' COMPASSES

Sven Wilhelm Åhblom, Stockholm, Sweden, assignor to Svenska Aktiebolaget Gasaccumulator, Lidingo, near Stockholm, Sweden, a corporation of Sweden Application July 14, 1945, Serial No. 605,062
In Sweden July 8, 1944

Section 1, Public Law 690, August 8, 1946
Patent expires July 8, 1964

10 Claims. (Cl. 33—224)

1

The present invention relates to an improvement in compass scales of aircraft compasses and mariners' compasses and has for its object to render it possible to effect a rapid and simple compensation of the compass in such manner that the deviation of the compass is eliminated practically completely, and the pilot is enabled to steer his course by the compass without the aid of a deviation table.

The improvement according to the invention is mainly characterized by the compass scale consisting of or being applied to a body the length of which is variable in such manner that upon a change of the length of the body between two points of the same, due either to extension or to compression of the body, all divisions of the scale located between said two points suffer an equal change and thus remain mutually equal, the said body being provided at various points along its length with means for securing the body to a support or seat for the same in the compass. The body constituting or supporting the scale may suitably consist of an elastic or resilient material, such as rubber, or a helical spring.

The advantages gained with the device according to the present invention will become apparent from the following description of two constructional forms of compasses embodying the invention.

In the accompanying drawing Fig. 1 shows a perspective view, partly in section, of a compass provided with a compass scale according to the invention. Fig. 2 shows in a similar manner a portion of a compass according to a second constructional form.

The compass shown in Fig. 1 is of the type in which the compass needle 1, which is supported by the pivot 2, is enclosed in the bowl 3 which contains a liquid and is covered by a glass pane 4. Provided on said glass pane 4 is a steering line or lubber's point 5 which is positioned in the longitudinal direction of the vessel or aircraft. Above the said glass pane 4 is a second glass pane 6 which is secured in a frame 7 which is rotatable on the rim of the bowl 3. The said glass pane 6 is provided with two parallel lines 8 located at equal distances from the center of the compass so that by turning the frame 7 on the bowl the said lines 8 may be adjusted in positions parallel to the compass needle 1 on either side of the same. When such adjustment of the frame 7 has been effected, the compass course may be observed on a scale 9 provided in the frame 7, against the lubber's point 5 on the glass pane 4.

2

In the constructional form illustrated in Fig. 1 the said scale 9 consists of a helical spring 10 having a triangular cross section. This spring may have a number of turns equal to the number of parts or divisions into which it is desired to have the circumference of the compass graduated, for instance 360 turns when the compass is graduated in degrees, in which case each turn of the spring represents one degree of the scale. Or the spring may have a number of turns equal to a fraction of the number of parts or divisions of the scale, so that each turn represents two or more degrees or divisions. Each of those turns of the spring that are located at the cardinal points of the scale, is provided with a numeral 11 made of metal and representing the corresponding number of degrees, and such numerals may also be attached to other turns of the spring, for instance to those turns that represent every tenth or fifteenth degree. In the construction illustrated in Fig. 1, the scale is graduated in the clockwise direction.

The helical spring 10 is positioned in a seat or groove 12 in the frame 7, said groove having a triangular cross section. An annular slot 13 extends from said groove 12 to the upper surface of the frame 7. Screws 14 attached to the turns of the helical spring at spaced intervals, extend through the said slot 13 beyond the upper surface of the frame, the projecting ends of said screws 14 carrying nuts 15. Each screw 14 and nut 15 forms a securing means for securing the turn of the spring to which the screw is attached, to the frame 7. Each screw may be displaced in the circumferential direction in the slot 13, and the associate turn of the spring may thus be adjusted in desired position, as will be explained hereinafter. The said securing means 14 and 15 are preferably provided at those turns of the spring to which the abovementioned numerals 11 are attached.

When a compass of the construction above described is to be compensated, the vessel or aircraft is swung to different known magnetic courses. For each such course the frame 7 is turned on the compass bowl 3 in such manner that the two parallel lines 8 on the glass pane 6 become parallel with the compass needle 1. In this position of the frame 7 that mark or degree on the scale which corresponds to the magnetic course in question, is adjusted relatively to the frame so that it occupies a position opposite the lubber's line 5 on the glass pane 4, after which this degree or mark on the scale is fixed in the said position relatively to the frame 7 by means of a securing device 14, 15. It will be understood that for the purpose of effecting this compensation of the compass it is suitable to choose such known magnetic courses in respect of which the spring is provided with securing means at the corresponding points or marks on the scale. It will further be understood that if there is deviation of the compass in the various magnetic courses the corresponding points on the scale which are secured to the frame 7, will not be positioned at an angular distance from one another which actually corresponds to the number of degrees on the scale between the said points, but said points will be at a greater or less angular distance from one another, which is rendered possible by the elasticity of the spring. However, the divisions of the scale, that is to say the distances between every two adjacent turns of the spring between the said points, always become mutually equal.

If the vessel or aircraft is swung to a sufficiently large number of known magnetic courses, and if for every such course the corresponding mark or degree on the scale is adjusted and fixed opposite the lubber's line in the manner above described, then that part of the deviation curve which is located between two adjacent points of the scale secured to the frame 7, may be deemed to be approximately a straight line, and since the deviation is zero in every such point of the scale that is fixed to the frame 7, it follows that the entire deviation curve may be regarded as being approximately a straight line. It will be understood, therefore, that after compensation of the compass has been effected in the manner above stated, it is possible to steer by the compass without the use of a deviation table.

When the compass is compensated in the manner above described, it is not necessary to compensate the compass in the usual manner by the use of magnets, but as a rule it may be advisable to effect such compensation with magnets in order to remove the greatest errors of deviation. In this case all securing means for the scale or spring are, of course, made loose, with the exception of the securing means at the north point of the scale. When thus unfixed the scale is free to adjust itself due to its elasticity in such manner that the divisions of the scale become equally large all along the scale. When compensation has been effected in the usual manner by the use of magnets, the remaining deviation is corrected according to the invention in the manner above described.

In the constructional form illustrated in Fig. 2 the compass needle 21 is pivoted in the usual manner on the pivot 22 in the bowl 23 which is covered by a glass pane 24. The point of the compass needle moves along the scale which in this case consists of a helical spring 25 having a circular cross section. As in the construction above described with reference to Fig. 1, the spring 25 may have a number of turns equal to the number of marks or degrees of the scale, or equal to a fraction of the number of degrees, and it may be provided with numerals secured to turns of the spring spaced at suitable angular distances from one another, the turns of the spring intermediate such numerals serving as divisions of the scale. In the construction illustrated in Fig. 2 the scale is graduated in the counter-clockwise direction. The spring 25 is positioned in an annular seat or groove 26 having a circular cross section in the wall of the compass bowl 23. Said wall is also provided with recesses spaced at suitable angular distances from one another and serving to receive toothed pinions 27 having vertical shafts 28 which pass through bores in the cover frame 29 of the bowl to the upper side of said frame. The said shafts 28 may have a sufficiently tight fit in said bores to provide a liquid-tight seal between the shafts and the cover frame, or the shafts may be provided with packings, not shown in the drawing, for this purpose, so as to make the compass fluid-tight. The pinions 27 are rigidly secured to the shafts 28 so that they will turn with the shafts. The outer end of each shaft 28 is provided with a hexagonal head 30 which may be engaged by a wrench or the like for turning the shaft and thus the pinion 27. The teeth of the pinion 27 mesh with the turns of the spring 25. Accordingly, when the pinion 27 is turned, as by means of a wrench, the pinion displaces the spring in the circumferential direction in the annular seat, so that the spring is compressed on one side of the pinion and extended on the other side. In order to secure the pinion 27 in adjusted position and prevent accidental movement thereof, the pinion 27 and the head 30 may have a sufficiently tight fit to the cover frame 29 to provide the necessary friction, or any suitable locking device, such as a spring ratchet engaging the teeth of the pinion 27, may be provided. Such devices are well known in the art, and therefore, it is not believed necessary to further describe the same.

For effecting compensation of the compass illustrated in Fig. 2, the vessel or aircraft is swung to various known magnetic courses, and for each such course the degree on the scale that corresponds to the course is adjusted opposite the north end of the compass needle by turning that pinion 27 which is positioned next to the said degree, and since the pinion 27 is locked in the adjusted position, the scale also becomes fixed at the degree in question. The vessel or aircraft is then swung to the next magnetic course and the operation of adjusting the scale or spring 25 is repeated.

It will be understood that when the compensation has been effected in the manner above described by adjusting the degree marks or numerals that correspond to the various magnetic courses, opposite to the north end of the compass needle, the compass course can only be observed at the north end of the compass needle. Consequently, if the indication of the compass needle is to be transmitted to some other instrument by mechanical, optical, or electromagnetic means, the impulses must be derived from the north end of the compass needle.

I claim:

1. In a compass of the character described, the combination of a circular compass scale comprising a helical metal wire spring, the turns of said spring representing graduations of the scale, numerals representing degrees attached to turns of said spring at spaced points intermediate the ends thereof, a support for said spring, and a plurality of securing means for securing said spring to said support simultaneously at spaced points along its length.

2. In a compass of the character described, the combination of a bowl, an annular compass scale consisting of a helical metal wire spring, the turns of said spring representing graduations of the scale, numerals representing degrees attached to turns of said spring at spaced points thereof, an annular groove in said bowl serving as a seat to receive said spring, an annular slot extending from said groove in said bowl to the outer surface of said bowl, screw-threaded stems secured to those turns of said spring to which numerals are attached, said stems extending through said slot beyond the outer surface of said bowl, nuts screw-threaded on the projecting ends of said stems and adapted to be screwed against the surface of the bowl, thereby to secure the associate turn of the spring in position in said groove.

3. In a compass of the character described, the combination of a bowl, an annular compass scale consisting of a helical metal wire spring, the turns of said spring representing graduations of the scale, numerals representing degrees attached to said spring at spaced points thereof, an annular groove in said bowl serving as a seat to receive said spring, toothed pinions rotatably journalled in said bowl at spaced points along the circumference thereof and meshing with the turns of said helical spring, and means accessible from the outside of said bowl for rotating said pinions so as thereby to effect extension or compression of the part of the spring intermediate two such pinions.

4. In a compass of the character described, the combination of a circular compass scale comprising a helical metal wire spring, the turns of said spring representing graduations of the scale, a support for said spring, and a plurality of securing means for simultaneously securing said spring to said support at spaced points along its length and between the ends thereof to said support.

5. In a compass, deviation compensating means comprising a circular scale of predetermined diameter, all portions of which are extensible and contractible in a circumferential direction, a support for said scale to maintain the diameter thereof and permitting circumferential adjustment of the several portions thereof, and adjustable means for determining the positions of a plurality of points of said scale with respect to said support whereby the amount and direction of the compass deviation at orientations thereof corresponding to said plurality of points can be compensated for by shifting said adjustable means so as to obtain a compensated reading at said points, the several portions of said scale lying between said points being independently contracted or extended so as to provide readings which are approximately compensated in direction and amount for compass deviations.

6. The combination as claimed in claim 4 in which said securing means comprise toothed pinions rotatably journaled in said support at said spaced points, said pinions meshing with the turns of said helical spring.

7. Compass deviation compensating means as claimed in claim 5 in which said circular scale comprises an elastic body having numerals representing degrees attached to said elastic body at spaced points thereof.

8. Compass deviation compensating means as claimed in claim 5 in which said circular scale comprises a helical spring, the turns of which represent graduations of the scale.

9. Compass deviation compensating means as claimed in claim 5 in which said adjustable means comprise a plurality of spaced members slidably mounted on said support and fixedly secured to said scale, together with means for adjustably securing said members to said support in fixed positions.

10. Compass deviation compensating means as claimed in claim 5 in which said adjustable means comprise a plurality of members disposed at fixed points on said support and having portions interlocking with said scale to maintain the same in adjusted position.

SVEN WILHELM ÅHBLOM.

REFERENCES CITED

The following references are of record in the file of this patent:

UNITED STATES PATENTS

| Number | Name | Date |
|---|---|---|
| 736,168 | Stinson | Aug. 11, 1903 |
| 1,422,925 | Carter | July 18, 1922 |
| 1,701,034 | Escallier | Feb. 5, 1929 |
| 2,331,298 | Bennett | Oct. 12, 1943 |
| 2,411,041 | Kahn | Nov. 12, 1946 |

FOREIGN PATENTS

| Number | Country | Date |
|---|---|---|
| 820,412 | France | Aug. 2, 1937 |